United States Patent [19]
Gibson

[11] Patent Number: 4,973,492
[45] Date of Patent: Nov. 27, 1990

[54] PROCESS FOR PREPARING BARBECUE MEAT PATTIES

[75] Inventor: Donald D. Gibson, Longwood, Fla.

[73] Assignee: Old South Foods, Inc., Altamonte Springs, Fla.

[21] Appl. No.: 510,003

[22] Filed: Apr. 13, 1990

[51] Int. Cl.$^5$ .................. A23L 1/314; A23L 1/317
[52] U.S. Cl. .................................. 426/641; 426/513; 426/646
[58] Field of Search ............ 426/272, 589, 641, 646, 426/480, 513, 393

[56] References Cited

U.S. PATENT DOCUMENTS

| | | | |
|---|---|---|---|
| 2,963,376 | 12/1960 | Hogan et al. | 426/646 X |
| 3,676,148 | 7/1972 | DeWeese et al. | 426/646 X |
| 3,689,285 | 9/1972 | Griffin et al. | 426/646 X |
| 4,472,448 | 9/1984 | Haggerty et al. | 426/589 |
| 4,832,970 | 5/1989 | Mally et al. | 426/513 X |

Primary Examiner—Arthur L. Corbin
Attorney, Agent, or Firm—Clifton Ted Hunt

[57] ABSTRACT

Barbecue meat patties of a pre-determined weight are formed by an automated process which includes the steps of providing a barbecue sauce including at least 5% of a binder, such as molasses and ketchup, mixing meat with the sauce to form barbecue meat while chilling the meat and sauce to a temperature of 28° F. to 32° F., forming the chilled meat and sauce into patties under a pressure of 70 to 80 psi, and gradually freezing the patties to storage temperature.

10 Claims, 2 Drawing Sheets

PROCESS FOR PREPARING BARBECUE MEAT PATTIES

FIELD OF THE INVENTION

This invention relates to the automated production and packaging of meat and specifically to the automated production and packaging of individual servings of meat.

BACKGROUND OF THE INVENTION

It is known to package large quantities of hamburger patties by automation. See, for example, U.S. Pat. No. 4,514,434 issued Apr. 30, 1985 to Goldberger et al. for MEAT PATTY AND PROCESS FOR FORMING THE SAME. To applicant's knowledge, however, the automated production of large quantities of cooked and frozen barbecue patties has not been knoWn prior to applicant's invention of the production process and resulting product described and claimed herein.

The United States Department of Agriculture (U.S.-D.A.) requires that all meat sold or labeled as "barbecue" be cooked enough to lose at least thirty percent (30%) of its green or original weight. Meat that is not cooked enough to lose at least 30% of its green weight, but is cooked and mixed with a sauce, is called "BBQ", according to the U.S.D.A.

The distinction between "barbecue" and "BBQ" is recognized, but for the purpose of describing the invention the term "barbecue meat" is used herein to refer to any meat (pork, beef, poultry, or a mixture thereof) that is cooked and mixed with a sauce by automation before being sold. The term "barbecue patty" refers herein to any meat (pork, beef, poultry, or a mixture thereof) that is cooked, mixed with a sauce, and formed into a patty before being sold.

Currently, the automated production of cooked and frozen barbecue meat results in the cooked meat being packed in bulk within one to five pound containers and frozen in a centrally located production plant.

The frozen meat is shipped to the point of use, which may be a sandwich distributor, fast food outlet, delicatessen, cafeteria, restaurant, or grocery store. There, the entire one to five pounds is thawed and put into a warming pan and then portioned with a spoon onto plates or into sandwiches. The balance that is not served is either thrown out or refrigerated to be served another time.

The conventional practice of thawing one to five pounds of frozen barbecue meat, warming it, spooning out portions of it, and throwing out or refrigerating the unused portion to be served later is unsatisfactory in many establishments where the control of portions, inventory, and Waste is highly important.

These desirable advantages can be achieved by utilizing the process of this invention to package the barbecue meat in patties of a uniform selected weight for individual servings. When using the patty, the maximum number of servings per pound of meat can be achieved by eliminating over-portioning, eliminating waste, and eliminating or reducing employee theft.

EXAMPLE (Based on serving 10,000 pounds per day)

|  | Spoon Method | Patty Method |
| --- | --- | --- |
| Number of servings per pound | 3 | 5 |
| Total Servings | 30,000 | 50,000 |

The conventional spoon portioning of barbecue meat averages three servings per pound of meat. Use, for example, of a 3.2 ounce patty averages five servings per pound of meat for a forty percent (40%) increase in the number of servings per pound.

SUMMARY OF THE INVENTION

It is the object of this invention to form large quantities of barbecue meat into patties With automated machinery by mixing cooked meat particles With a sauce containing an adequate amount of binder while chilling the meat and sauce to critical temperature and forming the chilled mixture into patties under about 70 to 80 psi.

According to this invention, the automated production of barbecue patties of a desired Weight, such as 1.5 to 4 ounces apiece, results in patties having the requisite integrity to resist falling apart until they are warmed for consumption. The novel method of making the patties includes many of the usual steps taken in the automated production of cooked meat with certain novel, and critical, variations in the implementation of some of the steps.

Most of the eight steps summarized in FIG. 1 will be recognized by those skilled in the art as being common to the automated production of large quantities of cooked and frozen meat. However, as will more fully appear in the detailed description of the invention, there are novel details in the implementation of certain steps that are critical to the successful practice of the invention.

DETAILED DESCRIPTION OF THE INVENTION

Figure 1:
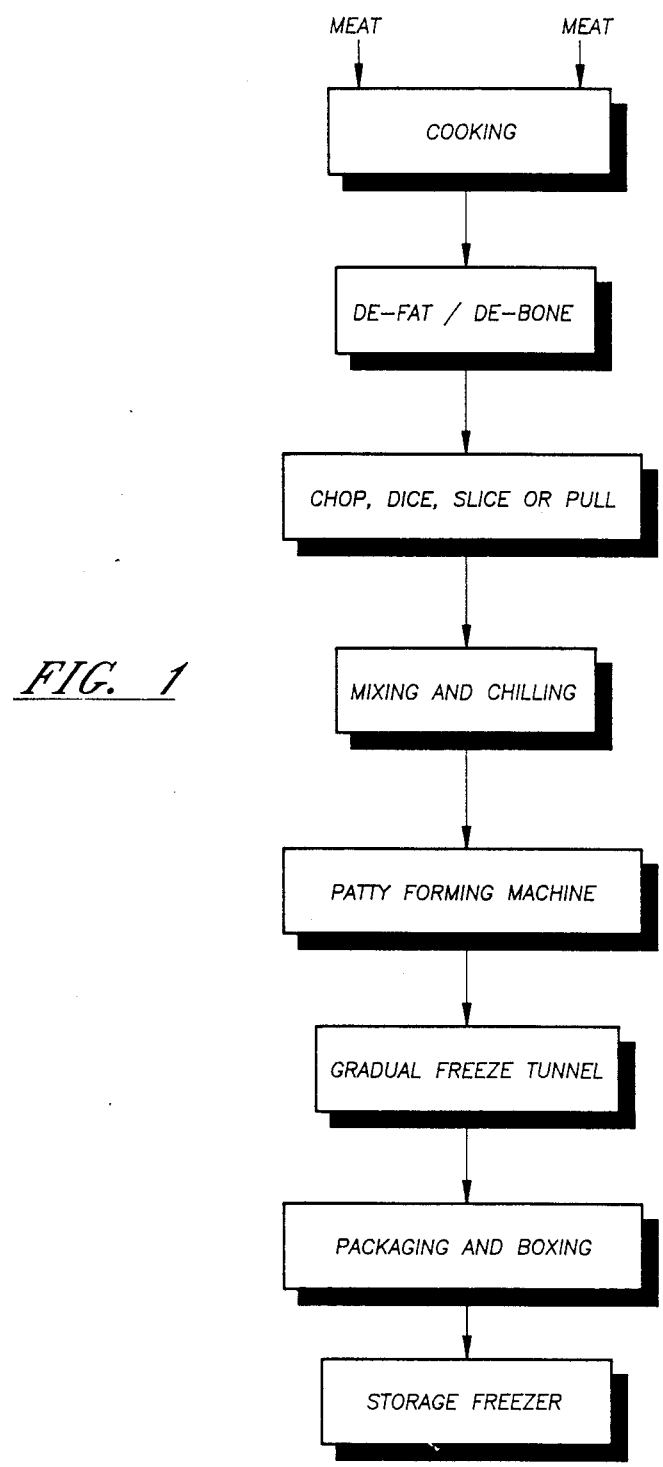
FIG. 1 is a flow chart of the process of the automated production of barbecue or BBQ patties.
Figure 2:
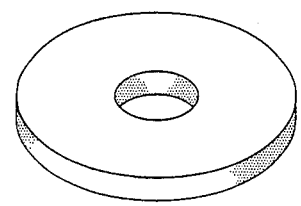
FIGS. 2 through 5 illustrate different shapes of the patty.
Figure 3:
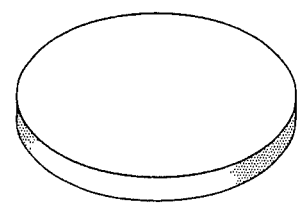
Figure 4:
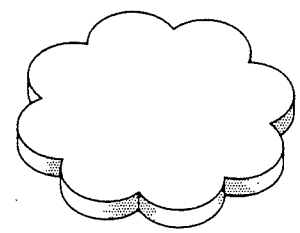
Figure 5:
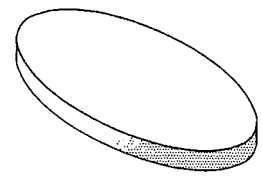

As illustrated in FIG. 1, the first essential step in the novel process of this invention for the automated production of a large quantity (1,000 pounds, for example) of cooked and frozen barbecue meat patties of a desired uniform size is to cook the meat. Prior to that, if desired, the meat may be tumbled with a marinate solution in the usual way.

The meat is cooked in a U.S.D.A. approved cookhouse or smokehouse, using gas, electricity, or steam, until the internal temperature of the meat reaches 170° F. The cooking time for pork is ten to twelve hours; the cooking time for beef is six to eight hours, and the cooking time for poultry is two to four hours. Preferably, the meat is smoked during the entire cooking cycle.

Next, the cooked meat is de-boned and at least 85% of the outside fat is removed from the meat.

The meat is then formed into a desired particle size by chopping, dicing, slicing, or pulling. The particle size may range from ⅛ of an inch to two inches in length and may be random or uniform in size, as desired, within a single run.

The process as thus far described is conventional for the automated production of cooked meat. According to the prior art, bulk barbecue meat is formed by placing the particles of meat in a mixer and mixing them With a sauce before packing one pound or more of the barbecue meat in containers to be quickly frozen.

According to the present invention, the meat particles are placed in a U.S.D.A. approved $CO_2$ mixer and mixed with a specially formulated barbecue sauce.

The specially formulated barbecue sauce includes a binder which functions to hold the meat particles together and helps retain the integrity of the patties to be formed from the meat. Examples of binders which have proven satisfactory in use include a binding gel, such as gelatin, ketchup, molasses, corn syrup, and tomato paste. Other binders may occur to those skilled in the art. Binders may be used together or singly with the flavoring and seasoning ingredients of the sauce. For example, one satisfactory barbecue sauce includes ketchup and molasses as a binder comprising 5% by weight of the sauce.

The barbecue sauce may comprise as much as sixty percent (60%) of the barbecue mixture, but barbecue meat patties with about forty to forty five percent (40% to 45%) sauce are very satisfactory. Thus, if 1,000 pounds of meat are put in the mixer, four hundred (400) pounds of the specially formulated barbecue sauce has been found satisfactory for pork and four hundred fifty (450) pounds of that sauce has been found satisfactory for either beef or poultry.

The meat particles and the sauce are blended together at not more than five revolutions per minute (5 rpm) for two minutes, at which time the barbecue meat is chilled to a temperature of 28° to 32° F. by adding carbon dioxide ($CO_2$) under a pressure of 700 psi while the blender continues to rotate at not more than five revolutions per minute for another two (2) minutes. The temperature is checked at the end of the four minutes of blending to be sure it is in the range of 28° to 32° F.

The blended meat and sauce (barbecue meat) is conveyed from the blender to a conventional patty forming machine and the patties are formed while maintaining the temperature of the barbecue meat in the range of 28° to 32° Fahrenheit.

The temperature range of 28° to 32° F. is critical to the satisfactory formation and integrity of frozen patties made from the cooked barbecue meat. If the temperature is above about 32° F., the meat particles will not coalesce and the patties will fall apart after they leave the patty forming machine. If the temperature of the meat is below about 28° F., the meat particles are frozen too hard to be bonded together. It is like trying to bind two rocks together.

The patties are formed by forcing the chilled barbecue meat through patty molds of one or more configurations as illustrated in FIGS. 2 through 5 or otherwise, as desired, under a pressure of 70 to 80 psi.

The pressure under which the patties are formed, the frozen moisture and liquid in the meat and sauce, the semi-frozen state of the meat particles, and the binder(s) in the barbecue sauce, are the factors that combine to provide stability to the cooked and frozen barbecue meat patties. The patties remain coherent until heated, as on a bun in a microwave oven.

The size of the patty molds determines the size and weight of the patties. For example, patties may be conveniently formed in weights of 1.5, 2.0, 2.5, 3.0, 3.2, 3.5, and 4.0 ounces. Newly formed patties are conveyed into a freeze tunnel that gradually freezes the patties to a suitable temperature for storage. The frozen patties are then packed in boxes for distribution to dealers. Fifteen 3.2 ounce patties in a three pound box provides a convenient amount of patties for a small dealer, who may thaw the patties individually as they are sold or dispensed to the consumer.

There is thus provided a process for the automated production of cooked barbecue meat patties of a uniform size and weight which will enhance the efficiency of handling and serving the meat at the consumer level.

Although specific terms have been employed in describing the invention, they have been used in a generic and descriptive sense only and not for the purpose of limitation, except with reference to the accompanying claims to invention.

I claim:

1. A process for the automated production of cooked and frozen barbecue meat patties of pre-determined weight, said process comprising the sequential steps of:
   (a) cooking meat;
   (b) forming the meat into a desired particle size;
   (c) providing a barbecue sauce containing at least 5% binder;
   (d) mixing the particles of meat with the sauce to form barbecue meat while chilling the meat particles and sauce to a temperature of not less than about 28° F. and not more than about 32° F.
   (e) maintaining the barbecue meat at said temperature while conveying the barbecue meat through a patty forming machine and forming patties under a pressure of about 70 to 80 psi;
   (f) gradually freezing the patties for storage; and then
   (g) packing the patties in containers.

2. A process according to claim 1 wherein the binder is selected from the group consisting of a gel, ketchup, molasses, corn syrup, tomato paste and mixtures thereof.

3. A process according to claim 1 wherein the sauce is 40% of the barbecue meat.

4. A process according to claim 1 wherein the sauce is 45% of the barbecue meat.

5. A process according to claim 1 wherein the sauce is 60% of the barbecue meat.

6. A process according to claim 1 wherein the meat is pork.

7. A process according to claim 1 wherein the meat is beef.

8. A process according to claim 1 wherein the meat is poultry.

9. A process according to claim 1 wherein the meat is deboned before being mixed with the sauce.

10. A process according to claim 1 wherein at least 85% of the outer fat is removed from the meat before the meat is mixed with the sauce.

* * * * *